Feb. 28, 1950
J. J. ROOT
2,498,864
TEMPERATURE REGULATION
Filed Dec. 20, 1945
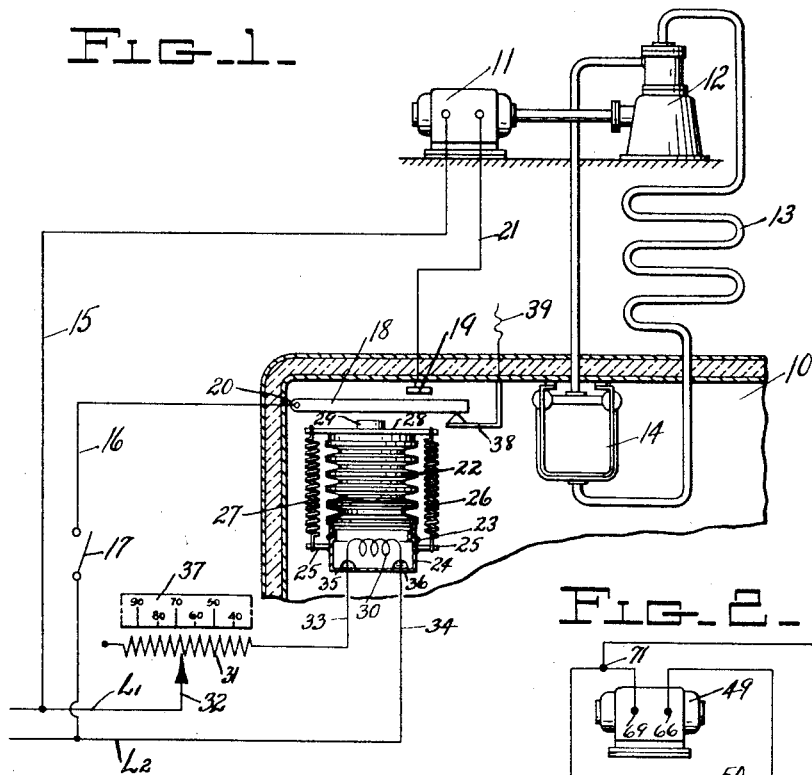
INVENTOR.
John J. Root
BY
S. Stephen Baker Patented Feb. 28, 1950

2,498,864

UNITED STATES PATENT OFFICE 2,498,864

TEMPERATURE REGULATION

John J. Root, New York, N. Y.

Application December 20, 1945, Serial No. 636,124

6 Claims. (Cl. 236—51)

This invention relates to temperature controls and more particularly to a temperature control which is electrically operated.

The control of electrically actuated refrigerating or heating systems generally involves the automatic actuation of the cold or heat producing components according to the temperature desired and attained. Thus, for example, the cold produced by a refrigerating system may react upon a thermal responsive element which may cut off the actuation of the cold producing component when the temperature has reached a predetermined level. Although most systems have their temperature controls located at the site of the apparatus, many types of installations find remote temperature control advantageous and the present invention is directed in part to a remote temperature control which can control the operation of a refrigerating or heating unit with precision.

It is an object of this invention, further, to provide an efficient, highly sensitive and sensitivity adjustable temperature control unit which is substantially unitary in construction in that the same component which causes operation of the system in response to manual control is also designed to respond to the temperature resulting from such operation.

Another object of my invention is to produce a temperature control in which the regulation is effective over an extremely wide range of temperatures without requiring a plurality of units which complement each other in successive relationship in order to achieve the wide range desired.

Another object of this invention is to provide a temperature control for systems employing both heat and cold producing units wherein these units contribute jointly to produce a desired temperature. The instant invention provides a means for controlling the actuation of either or both of these units according to a disparity in the temperature desired and that prevailing in the area served by the system.

Another object of this invention is to provide a temperature control unit utilizing the principle of producing a controllable degree of heat which serves as a refrence level in its effect on a thermal responsive element which effect is thereafter neutralized by the temperature produced. This invention, however, substantially confines the effect of the reference heat to the thermal responsive element so that it does not unduly interfere with the temperature which the system furnishes.

Other objects of my invention will be apparent from the following description, it being understood that the above general statements of the objects of my invention are intended to describe and not limit it in any manner.

Referring to the drawings herein,

Fig. 1 is a diagrammatic view of a temperature control device constructed according to the present invention.

Fig. 2 illustrates a modification thereof.

Referring to Fig. 1, the apparatus is illustrated as applied to an insulated enclosure 10 which may take the form of a refrigerator, a room, compartment, or any zone to be air conditioned or cooled. The operation of the refrigerating apparatus per se is conventional, the motor 11 driving a compressor 12 so that the refrigerant contained in the condenser 13 is compressed so as to be condensed at high pressure and conveyed to an evaporator 14. The apparatus described operates on the conventional compressor-condenser-expander cycle as is apparent to those skilled in the art.

According to the invention herein, control of the compressor 12 is provided by feeding or cutting off electrical current to the motor 11. The apparatus, therefore, controls the connection of electrical lines L1 and L2 to the motor 11 through wires 15 and 16. A switch 17 in the motor circuit is included so that the motor can be de-energized apart from the control to be hereinafter described. Motor 11 completes its electrical circuit through switch contacts 18 and 19, switch contact 18 being hinged as at 20 and switch contact 19 being connected to a wire 21 leading to the motor 11.

Automatic energization of motor 11 according to the temperature within zone 10 is accomplished by the pivoting motion of switch contact 18 so that in an elevated position thereof it meets switch contact 19, while in a normal or lowered position it opens the electrical circuit of motor 11.

Means for achieving the above mentioned elevated condition of contact 18 is provided through the medium of bellows 22 which is mounted in any suitable manner within zone 10 so that it can be caused to co-act with contact 18 as hereinafter described. Bellows 22 preferably takes the form of a collapsible metal tube partly broken away in Fig. 1 to illustrate the interior thereof. Secured as by a ring of solder 23 to an open end of bellows 22 is a metal cup 24. Pins 25 may be integral with cup 24 so as to serve as terminals for coil springs 26 and 27. The other terminals of the springs are supplied by disc 28 connected to the upper or closed end of bellows 22. A raised member 29 on disc 28 serves to apply upward pressure to switch contact 18 when bellows 22 is expanded against the action of springs 26 and 27.

Bellows 22 is preferably filled with a volatile fluid such as Freon which is easily influenced by temperature changes. In order to regulate the temperature to which the volatile fluid is subjected, a heating coil 30 is disposed within cup 24, or the interior of bellows 22, so as to heat the fluid in response to electrical current flowing in the heating coil 30.

Remote control of heater 30 is afforded by means of rheostat 31 having the movable arm 32 which serves to control the flow of current from lines L1, L2 to heating coil 30. Wires 33 and 34 entering the cup 24 for connection to the heating coil 30 are led through hermatic seals 35 and 36 which may be of the glass-to-metal seal type.

The coil 30 and volatile fluid are thus maintained in a sealed chamber wherein escape of the fluid is prevented and the temperature thereof can be modified through the remote means shown.

The operation of the apparatus illustrated in Fig. 1 is as follows:

Assuming switch 17 is closed, the operator may adjust arm 32 to the temperature desired according to the indications of indicia 37. While such indicia are illustrated as ranging from 40 to 90 degrees, it is to be understood that the actual range thereof may extend far below zero and much higher than 90 degrees. Assuming now that the lower temperature is required, the movable arm may be set to 40 degrees, for example. Heating coil 30 will thereupon be subjected to a higher voltage so as to heat the volatile fluid within bellows 22. The consequent expansion of the volatile fluid will extend or elevate bellows 22 against the action of springs 26 and 27. It will be understood that springs 26 and 27 may be interchangeable with other springs or may be adjustable in respect to their terminals so as to vary the sensitivity of bellows 22 accordingly. Thus, a stiffer spring will render the device less sensitive, while a finer spring will render it more so.

The elevation of bellows 22 will cause member 29 to bear outwardly against switch contact 18 so that it meets switch contact 19 and starts motor 11. The refrigerating process is thereupon put into operation and the evaporator 14 acts for effecting cooling of zone 10. Since bellows 22 is disposed within zone 10, it will obviously have its internal volatile fluid subjected to the temperature therein so as to modify the heating effect of coil 30 thereupon. After a period of operation of the refrigerating apparatus, when the temperature within zone 10 has become so low as to cool the volatile fluid and offset the effect of heating coil 30, the volatile fluid will contract so as to permit springs 26 and 27 to compress bellows 22, thereby lowering switch contact 18 and opening the electrical circuit of motor 11.

It can be seen from the foregoing description that the volatile fluid contained in bellows 22 is acted upon by two opposing forces one of which is adjustable so as to control the other. The device is highly sensitive because the produced temperature reacts principally upon the volatile fluid rather than upon the heating coil 30. Furthermore, coil 30 is effective almost entirely within the bellows 22 so that the heat therefrom is not supplied to the zone in general. Thus, very slight changes in its temperature are sufficient to actuate the volatile fluid accordingly without undue interference by the direct action of the temperature prevailing in zone 10. A contact or rest member 38 may be provided and, if desired, a wire 39 may be employed to connect the source line L2 to any other electrical apparatus such as a heater for zone 10 or an indicator of the non-operating state of motor 11.

In the embodiment of Fig. 2, the zone 45 to be heated or cooled, as desired, is shown in dash lines wherein is disposed a bellows 46 provided with springs 47 and 48 for the purpose above described. The refrigerating apparatus may substantially duplicate that shown and described in Fig. 1, the motor 49 serving to operate a compressor the ultimate cooling effect of which is applied to zone 45. A heater 50 which may take the form of a conventional heating coil of large capacity, or an infra-red radiation device, is included in the system and the effects thereof are similarly transmitted to zone 45 either by its presence therein or by a suitable duct system.

Means are provided to actuate either the motor 49 or the heater 50 according to the response of bellows 46 to the temperature in zone 45. Accordingly, electrical current lines L1 and L2 are applied to heating coil 51 through the rheostat 52 having the movable arm 53. Hermetic seals 54 and 55 are provided for the external wires 56 and 57 connected to the heating coil 51. Heating coil 51 is enclosed within a cup-shaped chamber 58 connected to the bellows 59. Maintained under suitable pressure in the chamber 58 and bellows 59 which communicates therewith as in the previous embodiment, is a volatile fluid or gas, which is responsive to heat variations applied thereto. Mounted on bellows 59 is a U-shaped member comprising the electrically conducting arms 60 and 61 bridged by an insulating section 62. Electrical contact member 63 is formed on arm 61 while a similar member 64 is formed on arm 60. Arm 61 is connected by wire 65 to terminal 66 of motor 49, while arm 60 is connected by wire 67 to terminal 68 of heater 50. The other terminals 69 and 70 of the motor 49 and heater 50 respectively are joined at point 71 which is then connected through wire 72 to switch 73 leading to the external current line L2. Bellows 59 may be provided with sensitivity springs, if desired, said springs being disposed and serving the function of springs 26 and 27 in Fig. 1.

Electric current line L1 is connected through wire 74 to a bar 75 which is arranged for movement between arms 60 and 61 by virtue of a pivot connection 76. Contact members 77 and 78 are formed on bar 75 so as to effect electrical contact between bar 75 and either arm 61 or arm 62. It will be apparent that, should contacts 77 and 63 meet, motor 49 will be energized through lines L1 and L2, whereas, should contacts 78 and 64 meet, heater 50 will be similarly energized.

Means for initially controlling the operation of the circuit is provided in the rheostat 52, the operator setting the arm 53 at any desired point, being guided in this operation by the indicia 79 which as in the previous embodiment may indicate a much greater range than that illustrated. In the condition illustrated, the movable arm is disposed at the indication of approximately 70 degrees and the consequent heating of the coil 51 is operative to maintain the bellows 59 in an elevated state capable of either further elevation or depression depending upon whether more or less voltage is applied to coil 51. This expedient of normally maintaining bellows 59 in an intermediate position of expansion is important since it permits reverse action by lowering the voltage on coil 51. Thus it can be seen that whereas the simple provision of an electric current to a coil cannot produce a cooling effect thereon, practically the same objective may be obtained by depriving the coil of a normal voltage so that in effect cooling means are provided.

If arm 53 is moved closer to the 90 degree mark, for example, heater coil 51 will cause the volatile fluid to expand so that contacts 64 and 78 meet so as to energize heater 50. This will cause the temperature of zone 45 to increase and react upon bellows 46 located in the zone 45. Bellows 46 serves to similarly house a volatile fluid so that the temperature of zone 45 will cause bellows 46 to expand according to the effect of the heat on the enclosed gas or to collapse to a degree depending upon the contraction thereof due to cold. It will be understood that the nature of the bellows is such as to collapse in response to atmospheric pressure when the gas therein contracts, but the springs 47 and 48 provide a more positive action such as to permit adequate response to very small changes in the temperature of zone 45. Plate 80 which maintains the upper terminals of springs 47 and 48 is connected through extension 81 to the swingable bar 75 so as to translate the movements of bellows 46 into swinging of bar 75. Bellows 46 is preferably maintained normally in a condition of partial expansion so that it may either expand further or collapse in response to the temperature in zone 45.

The apparatus illustrated in Fig. 2 is operated as follows:

Assuming that bellows 59 has reacted in accordance with movement of arm 53 to cause contacts 64 and 78 to close the circuit of heater 50, the temperature of zone 45 will increase. The increased temperature will thereupon extend bellows 46 against the action of springs 47 and 48 so as to eventually lift bar 75 so as to cause contact 78 to leave contact 64.

Bellows 46 may be provided with a heater coil 85 energized through lines L1, L2, wires 86 and 87 and rheostat 88. Thus, as in the previous embodiment, an extremely wide range can be controlled by the device since the reference level, which is set by the heater coil in the thermal responsive element in the zone served by the apparatus, is controllable over a wide range. Obviously, the produced temperatures are correspondingly controlled. The range of the apparatus in Fig. 2 is set by adjusting rheostat 88 so that the changed temperature of the volatile fluid in bellows 46 must be overcome by the temperature of the zone before the counter-action of the bar 75 takes place.

When the temperature of zone 45 has reached the desired degree, the electrical circuit of heater 50 will be opened so as to discontinue the heating of the zone. In the event that the temprature of the zone decreased unduly, suitable contact for energizing the heater 50 would be re-established by the contraction of bellows 46.

Under certain conditions, the temperature of zone 45 might be so influenced as to cause it to rise higher than that desired and even to such an extent that the mere discontinuance of operation of the heater 50 is insufficient to maintain zone 45 at a temperature lower than that which would tend to be produced by such influence. Accordingly, bellows 46 would continue to expand until contact 77 closed with contact 63 so as to energize refrigerating motor 49 and restore the temperature of zone 45 to a condition wherein bellows 46 contracts to cut off the electrical current to motor 49. In this manner, an air conditioning system is provided which controls the actuation of either the refrigerating or the heating system according to the reaction of bellows 46 in the zone to be air conditioned.

It will be understood that whereas the rheostat 52 is illustrated as being in the region of both bellows, it is feasible, by virtue of the electrical conductors involved, to dispose the rheostat 52 remotely of the apparatus. It will be further appreciated that the control of bellows 59 serves to establish an area within which bar 75 will operate and will determine whether such operation will close the electrical circuit of either the refrigerating motor 49 or the heater 50 and so that the effect of such operation may react upon bar 75 so as to discontinue such operation.

I have shown a preferred embodiment of my invention, but it is obvious that numerous changes and omissions may be made without departing from its spirit. For example, while I have described the apparatus as being applied to the temperature control of a zone or region, it can be utilized in any environment where the operation of an apparatus is dependent upon particular temperature conditions.

I claim:

1. An operating control for a temperature regulating apparatus, comprising a bellows, a rigid section connected thereto and forming a closed chamber therewith, a thermal responsive fluid contained in said chamber, an electrical heater coil in said chamber so as to be in thermal relationship to said fluid, a variable electrical voltage source, electrical conductors from said variable voltage source to said electrical heater coil so as to produce heat variations therefrom according to the voltage variations applied thereto, and hermetic seals permitting the introduction of said conductors into said chamber while preventing the escape of said fluid therefrom, the responses of said thermal responsive fluid pursuant to said heat variations being operative to control the operation of said temperature regulating apparatus.

2. An operating control for an apparatus for regulating the temperature of the zone, comprising a bellows, a thermal responsive element in said bellows, an electrical heater coil in said bellows so as to be in thermal relationship to said element, a manually variable electric voltage source, electrical conductors from said variable voltage source to said electrical heater coil so as to produce heat variations therefrom according to the voltage variations applied thereto, a source of electrical current for said apparatus, a switch in the electrical circuit of said apparatus, said bellows being adapted to operate said switch upon expansion or contraction of said bellows pursuant to the response of said thermal responsive element to said voltage variations applied to said electrical heater.

3. An operating control for an apparatus for regulating the temperature of a zone, said control comprising a bellows, a thermal responsive fluid in said bellows, an electrical heater coil in said bellows so as to be in thermal relationship to said fluid, a manually variable electric voltage source, and electrical conductors from said variable voltage source to said electrical heater coil so as to produce heat variations therefrom according to the voltage variations applied thereto, a source of electrical current for said apparatus, a switch in the electrical circuit of said apparatus, said bellows being adapted to operate said switch upon expansion or contraction of said bellows pursuant to the response of said thermal responsive fluid to said voltage variations applied to said electrical heater, said bellows being disposed in the zone whose temperature is regulated by said apparatus whereby the influence of said heater coil upon said fluid is modified by the temperature conditions created by said apparatus.

4. An opening control for an apparatus for regulating the temperature of a zone, said control comprising a bellows, a thermal responsive fluid in said bellows, an electrical heater coil in said bellows so as to be in thermal relationship to said fluid, a voltage source for said electrical heater coil and disposed remotely therefrom, electrical conductors connecting said voltage source to said heater coil, a manually operated rheostat in one of said conductors, and disposed remotely of said heater coil, said rheostat being adapted to supply variable voltages to said heater coil so as to produce heat variations therefrom according to the voltage variations applied thereto, a source of electrical current for said apparatus, a switch in the electrical circuit of said apparatus, the response of said thermal responsive fluid to said heat variations being operative to expand or contract said bellows, said expansion or contraction of said bellows being adapted to operate said switch whereby the feeding of electrical current to said apparatus is controlled by said voltage variations.

5. An operating control for an apparatus for regulating the temperature of a zone, comprising a bellows, a rigid cup member connected thereto and forming a closed chamber therewith, a thermal responsive fluid contained in said chamber, an electrical heater coil within said chamber so as to be in thermal relationship to said fluid, a manually operated variable voltage source, electrical conductors from said variable voltage source to said electrical heater coil so as to produce heat variations therefrom according to predetermined voltage variations applied thereto, hermetic seals in said cup member permitting the introduction of said conductors into said chamber while preventing the escape of said fluid therefrom, an electrical circuit for said apparatus, a switch in said electrical circuit, the responses of said thermal responsive fluid to said voltage variations being operative to effect contraction or expansion of said bellows, the expansion or contraction of said bellows being operative to open or close said switch whereby the operation of said apparatus is controlled according to said voltage variations, spring means for maintaining said bellows in a normal state of contraction so that the expansion of said bellows pursuant to the heating of said fluid takes place against the action of said spring means, said bellows being disposed in the zone served by said apparatus so that the influences of said heater coil upon said fluid are modified by the temperature conditions created by said apparatus.

6. In a temperature regulating apparatus comprising two electrically actuated components acting in opposition to maintain a desired temperature in a zone, an operating control therefor comprising a first bellows, a thermal responsive fluid in said bellows, means to effect contraction or expansion of said bellows according to corresponding contractions or expansions of said thermal responsive fluid, means to apply and vary heat to said thermal responsive fluid so as to actuate said bellows accordingly, a pair of switch elements mounted on said bellows, each of said switch elements being included in the respective electrical circuits of each of said components, a third switch element adapted to coact with either of said pair of switch elements so as to close an electrical circuit for actuating either of said components, a second bellows located in the zone served by said apparatus, a thermal responsive fluid within said second bellows whereby said bellows is influenced by the reaction of said thermal responsive fluid to the temperature in said zone, said third switch element being operatively connected to said second bellows so as to be actuated according to said influence whereby coaction between either of said pair of switch elements and said third element is modified by the influence of the zone temperature upon said bellows, and means to apply and vary heat to the thermal responsive fluid in said second bellows.

JOHN J. ROOT.

REFERENCES CITED

The following references are of record in the file of this patent:

UNITED STATES PATENTS

| Number | Name | Date |
|---|---|---|
| 423,965 | Thomson | Mar. 25, 1890 |
| 2,046,578 | Parks et al. | July 7, 1936 |
| 2,052,769 | Hoesel | Sept. 1, 1936 |
| 2,060,774 | Zurcher | Nov. 10, 1936 |
| 2,129,477 | Parks | Sept. 6, 1938 |
| 2,286,843 | Roland | July 7, 1942 |

FOREIGN PATENTS

| Number | Country | Date |
|---|---|---|
| 541,830 | Great Britain | Dec. 12, 1941 |